3,626,749
Patented Dec. 14, 1971

1

3,626,749
FLUID DENSITY MEASURING APPARATUS
William Edward Abbotts, Farnborough, England, assignor to The Solartron Electronic Group Limited, Farnborough, England
Original application Jan. 25, 1967, Ser. No. 611,632, now Patent No. 3,516,283. Divided and this application Jan. 28, 1970, Ser. No. 888,102
Int. Cl. G01m 7/00, 9/10
U.S. Cl. 73—32                         3 Claims

ABSTRACT OF THE DISCLOSURE

A fluid density measuring apparatus includes an elastically resilient hollow vibratory tube which can be contacted by a fluid, the density of which is to be measured. A pneumatic embodiment thereof includes pulsation means for supplying a pressurized fluid against the external surface of the tube to excite the tube into natural vibration.

---

This application is a division of application Ser. No. 611,632, filed Jan. 25, 1967, now U.S. Pat. No. 3,516,283.

This invention relates to methods of measuring the densities of fluids and apparatus therefor.

It has been found that the frequencies of the natural bell-like vibrations excited when a hollow body of resilient material is, for example, struck vary with the density of a fluid which is in contact with a predetermined region of the hollow body. The predominant frequency of such vibrations, that is, the frequency of the vibrations containing most energy, is thus related to the density of such a fluid.

According to the present invention a method of measuring the density of a fluid comprises the steps of bringing the fluid into contact with a predetermined region of a hollow body formed of resilient material, exciting natural vibrations of the body, rendering a frequency of the vibrations substantially insensitive to variations in differential pressure exerted on the predetermined region at least within a given range of pressure and measuring the said frequency.

Also according to the present invention a density meter for measuring the density of a fluid includes a hollow body of resilient material, means for exciting natural vibrations of the hollow body, and means for generating a signal representative of a frequency of the said vibrations, the hollow body being such as to permit the application of the fluid to at least part of a wall thereof, the wall being of such thickness that the said frequency is substantially insensitive to variations in differential pressure exerted thereon within a given range of pressure.

Further according to the present invention, a density meter for measuring the density of a fluid includes a hollow body of resilient material, means for exciting natural vibrations of the hollow body, and means for generating a signal representative of a frequency of the said vibrations, the hollow body being much as to permit application of the fluid to external and internal surfaces of the hollow body at equal pressures.

The invention will now be further described by way of example with reference to the accompanying drawings in which.

2

Figure 1:
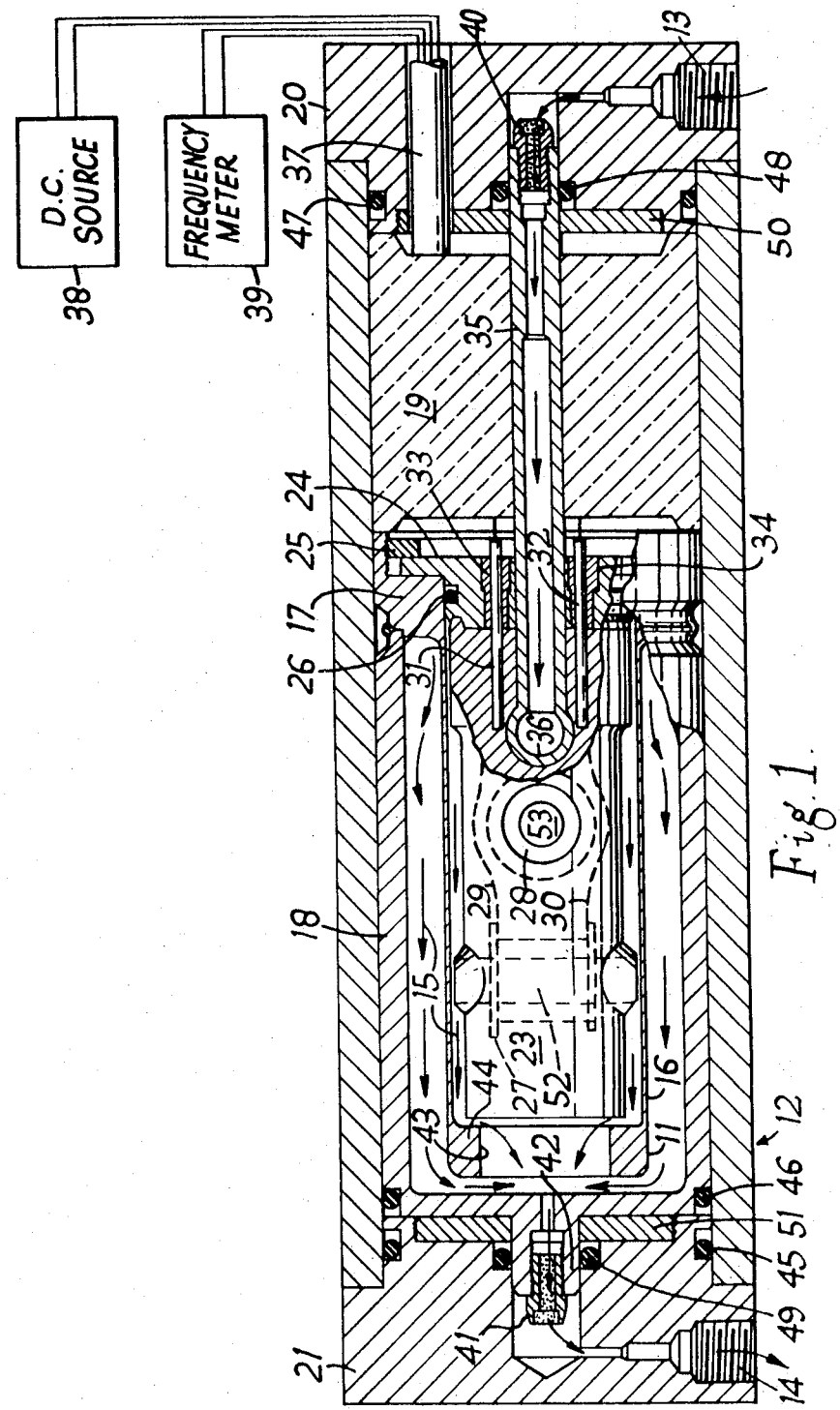
FIG. 1 shows partially in section a first embodiment of the invention.
Figure 2:
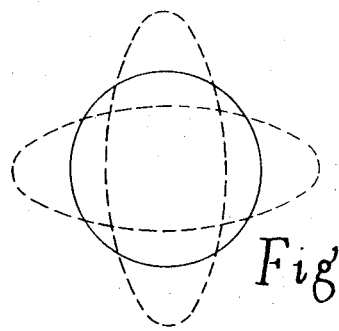
FIG. 2 illustrates natural bell-like vibrations of the hollow body of the first embodiment.
Figure 3:
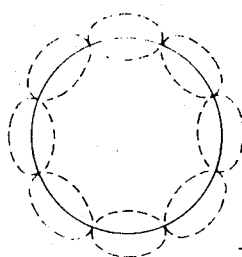
FIG. 3 illustrates further natural bell-like vibrations of the hollow body of the first embodiment.

Referring to FIG. 1, there is shown a density meter for measuring the density of a gas. A cylindrical tube 11 formed of ferromagnetic metal, such as Ni-Span-C 902 (trademark), is secured within a chamber 12 having an inlet port 13 and an outlet port 14. The directions of flow of the gas in operation are indicated by arrows as, for example, at 15. The cylindrical wall 16 of the tube 11 is integral with a flange 17 which fits slidingly within the chamber 12. The flange 17 is located between a chamber-lining member 18, to which the flange 17 is welded, and an amplifier 19. The chamber-lining member 18 and the amplifier 19 also fit slidingly within the chamber 12. The ends of the chamber 12 are formed by tightly fitted end members 20 and 21.

A cylindrical supporting body 23 of thermoset synthetic resin bonded to a metal end plate 24 is located coaxially within the tube 11, a flange on the end plate 24 being held against the flange 17 by a retaining ring 25 screw-threadedly engaged in a skirt formed on the flange 17. An O-ring 26 provides a gas-tight seal between the end plate 24 and the inner surface of the tube 11.

Figure 4:
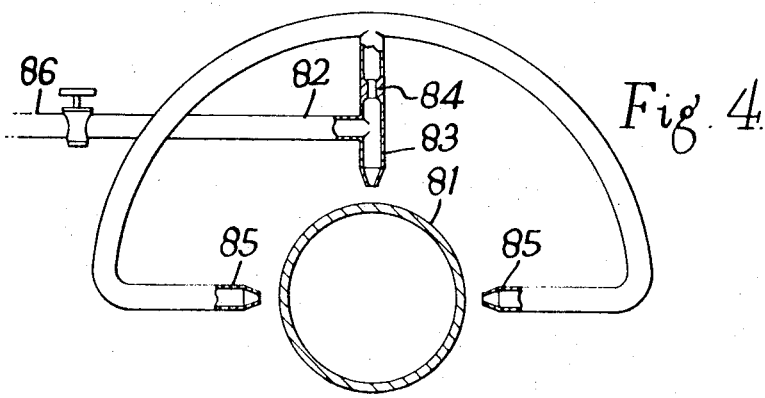
FIG. 4 is a simplified sectional view of part of a second embodiment of the invention.

A liquid density meter in which natural bell-like vibrations of the hollow body, which is a tube 81, are excited and maintained pneumatically is partially shown in FIG. 4. Air under a pressure higher than atmospheric pressure is supplied in operation through a supply line 82 to a drive nozzle 83 and through a restrictor 84 to two pick-up nozzles 85. The pick-up nozzles 85 are diametrically opposed to one another relative to a cross-section of the tube 81 and each is angularly spaced from the drive nozzle 83 by 90° about the longitudinal axis of the tube 81.

A liquid of which the density is to be measured fills the bore of the tube 81 in operation, the wall of the tube being sufficiently thick for changes in the difference in pressure across the wall to be negligible in comparison with the changes in the density of the liquid insofar as the predominant frequency of natural bell-like vibrations of the tube 81 are concerned.

The vibrations are initially excited by the impulse received by the tube 81 from the jet of air directed thereon by the drive nozzle 83 when a control valve 86 is opened. The tube 81 at first distorts in the cross-section shown in FIG. 4 to an ellipse having its major axis aligned with the nozzles 85, thereby restricting the flow of air from the nozzles 85 and facilitating the flow of air from the nozzle 83. The cross-section of the tube 81 then returns elastically to its undistorted circular form shown in FIG. 4 and overshoots to become an ellipse having its major axis aligned with the drive nozzle 83, thereby restricting the flow of air from the nozzle 83 and facilitating the flow of air from the pick-up nozzles 85. It will be realised that the flow of air from the drive nozzle 83 is thus caused to pulsate at a frequency equal to the frequency of the natural bell-like vibrations of the tube 81, which are consequently maintained.

The predominant frequency of the vibrations can be measured by means of a frequency meter coupled to, for example, strain gauges (not shown) appropriately located on the tube 81.

Other embodiments of the present invention can be constructed having means for exciting natural bell-like vibrations in a hollow body comprising, for example, magneto-strictive apparatus or a mechanical striking mechanism that excites damped vibrations which are allowed to die away, the hollow body being struck once for each frequency reading required.

Furthermore, embodiments can be constructed in which the means for exciting natural bell-like vibrations of the hollow body comprise a variable-frequency electrical oscillator having its output coupled to the hollow body. In such an embodiment the means for generating a signal representative of the predominant frequency of the vibration can comprise the variable-frequency electrical oscillator, which may be calibrated to read directly in density units. In operation, the frequency of the variable-frequency oscillator is varied until means for sensing the amplitude of the vibrations of the hollow body indicate a maximum in the amplitude, the frequency at which this occurs being the predominant frequency of the natural bell-like vibrations.

Although in the embodiments described with reference to the drawings natural bell-like vibrations are excited, further embodiments can be constructed in which other modes of natural vibration are excited such as natural transverse vibrations, natural longitudinal vibrations, and natural flexible vibrations. Furthermore, embodiments in accordance with the invention can be constructed in which a frequency other than the predominant frequency of the natural vibrations is measured, such frequency being by virtue of the construction and operation of embodiment rendered insensitive to variations in differential pressure.

For the purpose of determining the thickness of wall sufficient to render a frequency of the natural vibrations of a hollow body substantially insensitive to variations in differential pressure, use may be made of the equation $$f^2 = f_0^2 \times \frac{(1 + p/p_0)}{\left(1 + \frac{D}{D_1}\right)\left(1 + \frac{D^1}{D_2}\right)}$$

where $f$ is the resonant frequency of the hollow body, $f_0$ is a constant, $p$ is the differential pressure taken to be positive when acting from the interior to the exterior of the hollow body, $p_0$ is a constant dependent upon the size, shape, and material forming the hollow body, $D$ is the density of the fluid within the hollow body acting on the wall, $D^1$ is the density of the fluid outside the hollow body acting on the wall, and $D_1$ and $D_2$ are constants dependent upon the dimensions, material and shape of the hollow body.

The dependence of the constants $p_0$, $D_1$, $D_2$ on the thickness of the wall can be determined empirically.

Thus it is possible to determine the required thickness of a wall of an embodiment in which the fluid of which the density is to be measured is applied to the interior or to the exterior only of the hollow body, and the range of pressure over which a frequency of the hollow body is substantially insensitive to variations in the differential pressure.

I claim:

1. In an apparatus for measuring the density of a fluid flowing through the interior of an elastically resilient hollow vibratory tube, pulsation means external of said tube for exciting said tube into natural vibration, said pulsation means comprising means for supplying a pressurized fluid through a conduit, first nozzle means connected with said conduit and positioned to direct said pressurized fluid against the external surface of said tube, second nozzle means connected with said conduit and positioned to direct pressurized fluid against the external surface of said tube, said second nozzle means being offset from said first nozzle means so that when pressurized fluid from said first nozzle means is directed against the external surface of said tube, said tube will deform toward said second nozzle means, and as said tube elastically recovers and moves away from said second nozzle means, it elastically deforms toward said first nozzle means, said tube having a wall thickness such that the frequency of tube vibration is substantially independent of changes in pressure differentials across said tube wall caused by the fluid within said tube, said second nozzle means comprising a pair of diametrically opposed nozzles aligned with each other on opposite sides of said tube, said first nozzle means comprising a single nozzle which is offset circumferentially about said tube by an angle of 90° from each nozzle of said pair comprising said second nozzle means.

2. In an apparatus as defined in claim 1, said pressurized fluid being air delivered through said conduit at a pressure greater than atmospheric pressure.

3. In an apparatus as defined in claim 2, said connection between said conduit and said second nozzle means including a flow restrictor.

References Cited

UNITED STATES PATENTS

| | | | |
|---|---|---|---|
| 2,554,212 | 5/1951 | Quinlan | 73—71.5 X |
| 2,551,289 | 5/1951 | Quinlan | 73—71.5 |
| 3,225,588 | 12/1965 | Moulin et al. | 73—32 |

OTHER REFERENCES

Harris and Crede "Shock and Vibration Handbook," 1962, pp. 25/60, 25/61.

RICHARD C. QUEISSER, Primary Examiner

E. J. KOCH, Assistant Examiner

U.S. Cl. X.R.

73—30, 67.2